United States Patent
Moriki et al.

(10) Patent No.: US 8,010,719 B2
(45) Date of Patent: Aug. 30, 2011

(54) VIRTUAL MACHINE SYSTEM

(75) Inventors: Toshiomi Moriki, Kokubunji (JP); Keitaro Uehara, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 345 days.

(21) Appl. No.: 11/771,176

(22) Filed: Jun. 29, 2007

(65) Prior Publication Data
US 2008/0172499 A1 Jul. 17, 2008

(30) Foreign Application Priority Data
Jan. 17, 2007 (JP) .................................. 2007-008220

(51) Int. Cl.
*G06F 3/00* (2006.01)
*G06F 5/00* (2006.01)

(52) U.S. Cl. ................ 710/40; 710/39; 710/36; 710/22; 710/62

(58) Field of Classification Search ............. 710/62, 710/40, 39, 36, 22
See application file for complete search history.

(56) References Cited

U.S. PATENT DOCUMENTS

| | | | | |
|---|---|---|---|---|
| 4,965,796 A * | 10/1990 | Petty | ................. | 370/538 |
| 5,347,514 A * | 9/1994 | Davis et al. | ................. | 370/429 |
| 5,881,248 A * | 3/1999 | Mergard | ................. | 710/100 |
| 6,496,847 B1 | 12/2002 | Bugnion et al. | | |
| 6,606,701 B1 * | 8/2003 | Tsubota | ................. | 712/207 |
| 6,735,639 B2 * | 5/2004 | Higuchi | ................. | 710/6 |
| 6,961,806 B1 * | 11/2005 | Agesen et al. | ................. | 711/6 |
| 6,985,956 B2 * | 1/2006 | Luke et al. | ................. | 709/229 |
| 7,143,223 B2 * | 11/2006 | Hack et al. | ................. | 710/266 |
| 7,293,094 B2 * | 11/2007 | Vaman et al. | ................. | 709/227 |
| 2005/0097384 A1 | 5/2005 | Uehara et al. | | |
| 2006/0184349 A1 * | 8/2006 | Goud et al. | ................. | 703/24 |
| 2006/0236094 A1 * | 10/2006 | Leung et al. | ................. | 713/152 |
| 2007/0124563 A1 * | 5/2007 | Sekiyama | ................. | 712/36 |
| 2007/0180041 A1 * | 8/2007 | Suzuoki | ................. | 709/207 |

FOREIGN PATENT DOCUMENTS

JP 2005-122640 5/2005

* cited by examiner

*Primary Examiner* — Alford W Kindred
*Assistant Examiner* — Farley Abad
(74) *Attorney, Agent, or Firm* — Mattingly & Malur, P.C.

(57) ABSTRACT

Arbitration of IO accesses and band control based on the priority of virtual servers is enabled while curbing performance overhead during IO sharing among the virtual servers. A virtual machine system includes a CPU, a memory, a hypervisor that generates plural virtual servers, and an IO controller that controls an IO interface. The IO controller includes: a DMA receiving unit that receives DMA requests from the IO interface; a decoder that decodes received DMA requests and locates the corresponding virtual servers; a DMA monitoring counter that monitors DMA processing status for each of the virtual servers; a threshold register set in advance for each of the virtual servers; and a priority deciding unit that compares the DMA monitoring counter and the value of the threshold register, and based on processing priority obtained as a result of the comparison, decides the priority of processing of the received DMA requests.

17 Claims, 15 Drawing Sheets

FIG.12

| VM# (=TC#) | VC# |
|---|---|
| 0 | 0 |
| 1 | 1 |

2200
VC# CORRESPONDING
TO VIRTUAL SERVER #0

2201
VC# CORRESPONDING
TO VIRTUAL SERVER #1

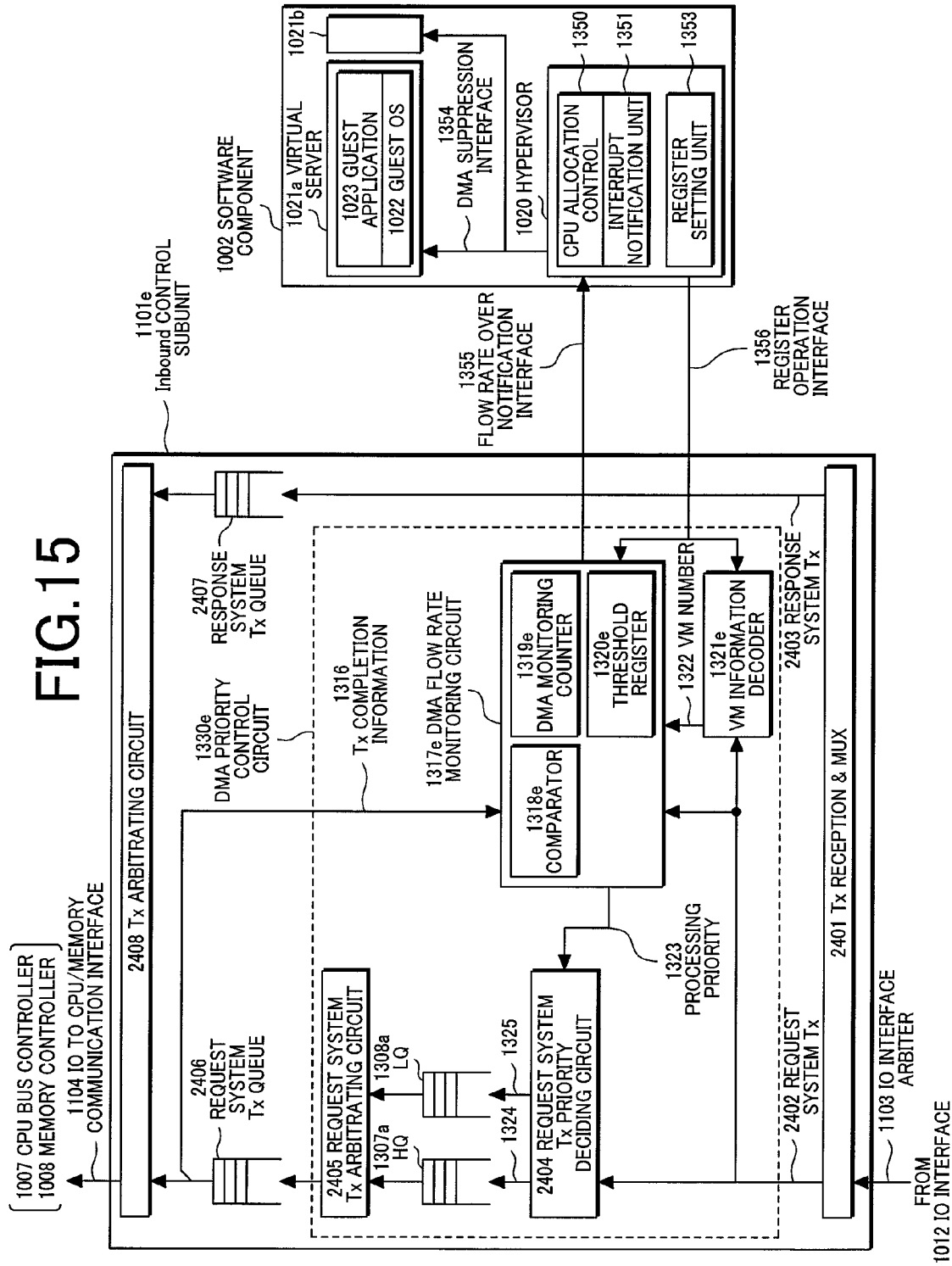

VIRTUAL MACHINE SYSTEM

CLAIM OF PRIORITY

The present application claims priority from Japanese Application JP 2007-008220 filed on Jan. 17, 2007, the content of which is hereby incorporated by reference into this application.

BACKGROUND OF THE INVENTION

The present invention relates to a virtual machine system, and technology for sharing IO (Input/Output) devices among plural virtual servers.

A virtual machine system is widely known in which plural virtual servers are configured on one computer, and an operating system (OS) is individually run on each server. To run a large number of virtual severs in a virtual machine system, IO devices must be shared among the virtual servers.

As technology for sharing IO devices among virtual servers, a method of emulating the IO devices by software is known. A method disclosed by U.S. Pat. No. 6,496,847 provides virtual IO devices for an OS on a virtual server. A virtual machine monitor (hereinafter referred to as VMM) receives accesses to virtual IO devices and transfers them to a host OS, which centrally manages accesses to physical IO devices.

As another technology for sharing IO devices among virtual servers, a method of using arbitration hardware that arbitrates accesses to IO devices among virtual servers is known. A method disclosed by Japanese Patent Application Laid-Open Publication No. 2005-122640 monitors writing to a memory map IO (MMIO) register, and performs access to a physical IO device upon a write to a specific register.

BRIEF SUMMARY OF THE INVENTION

However, the related art disclosed in U.S. Pat. No. 6,496,847 does not control IO accesses among virtual servers with priority and QoS (Quality of Service) in mind, so that IO bands cannot be specified according to the priority of services run on the virtual servers.

Placing certain limitations on IO accesses by software components such as VMM could not be said to be sufficient in terms of future wider bands of IO devices because performance overhead on IO processing increases.

On the other hand, in the related art described in Japanese Patent Application Laid-Open Publication No. 2005-122640, since plural virtual servers access arbitration hardware at the same time, it is not realized to perform arbitration according to IO priority of virtual servers.

The present invention has been made in view of the above-described problems, and its object is to provide a machine system that realizes the arbitration of IO accesses and band control based on the priority of virtual servers while curbing performance overhead during IO sharing among the virtual servers.

The present invention is a machine including a central processing unit (hereinafter referred to as CPU), a memory, and an IO interface. The machine is configured to include a hypervisor that generates plural virtual servers, and an IO controller that controls the IO interface, wherein the IO controller includes a DMA receiving unit that receives DMA (Direct Memory Access) requests from the IO interface, a first decoder that decodes a received DMA request and locates a corresponding virtual server, a DMA monitoring counter that monitors a DMA processing status for each of virtual servers, a threshold register set in advance for each of virtual servers, and a priority deciding circuit that compares the DMA monitoring counter and the value of the threshold register, and decides the priority of processing of the received DMA request.

In a computer including a CPU, a memory, and IO devices, the computer includes a hypervisor that generates plural virtual servers, and the IO devices include a DMA request issuing unit that issues DMA requests, a DMA monitoring counter that monitors a DMA issuance status for each of virtual servers, a threshold register set in advance for each of virtual servers, and a priority deciding circuit that compares the DMA monitoring counter and the value of the threshold register, and decides the priority of a DMA request to be issued.

In the present invention, the IO controller or IO devices monitors DMA processing status or issuance status for each of virtual servers by comparing with threshold. By this construction, because of independence from software such as VMM, the arbitration of IO accesses and band control based on the priority of the virtual servers are enabled while curbing performance overhead during IO sharing.

BRIEF DESCRIPTION OF THE DRAWINGS

These and other features, objects and advantages of the present invention will become more apparent from the following description when taken in conjunction with the accompanying drawings wherein:

FIG. 12 is a drawing showing a table of correspondences between virtual server numbers and VCs;

FIG. 15 is a block diagram showing the structure of a fourth embodiment of the present invention.

DETAILED DESCRIPTION OF THE INVENTION

Hereinafter, preferred embodiments of the present invention will be described with reference to the accompanying drawings.

First Embodiment

Figure 1:
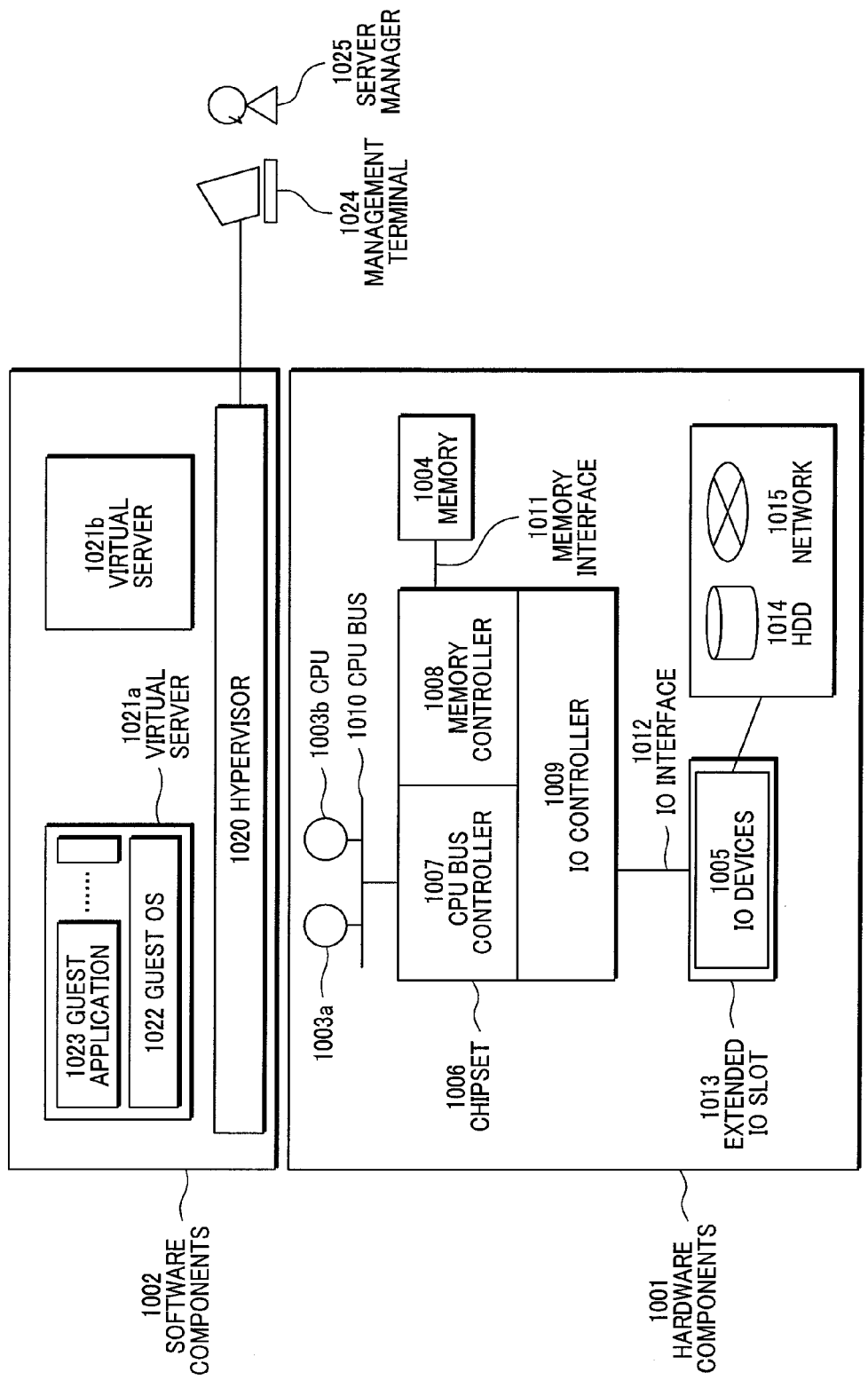
FIG. 1 is a block diagram showing an example of a computer configuration that the present invention presupposes.

FIG. 1 shows an example of the structure of a virtual machine system that embodiments including a first embodiment presuppose. The computer mainly comprises hardware components 1001 and software components 1002.

The hardware components 1001 include CPUs 1003a and 1003b as processing units, a memory 1004 as a storing unit, and IO devices 1005, which are mutually connected via a chipset 1006. The chipset 1006 is connected with CPUs 1003a and 1003b through a CPU bus 1010, with the memory 1004 through a memory interface 1011, and with the IO devices 1005 through an IO interface 1012 and an extended IO slot 1013. The IO devices 1005 are further connected with HDD (Hard Disk Drive) 1014 or a network 1015.

The chipset 1006 is internally divided into a CPU bus controller 1007, a memory controller 1008, and an IO controller 1009, which respectively control the CPU bus 1010, memory interface 1011, and IO interfaces 1012, which are connected with the chipset. Although the number of individual components of the hardware components 1001 is one or two for convenience of the drawing, the present invention is not limited to them. PCI express link of industry standards, which is primarily presupposed as the IO interface 1012, can also apply to other IO buses and IO ports without being limited to it.

The software components 1002 include a hypervisor 1020, a virtual servers 1021a and 1021b. The hypervisor 1020, which generates and controls the virtual servers 1021a and 1021b, is connected to a management terminal 1024 and receives operations from a server manager 1025. The server manager 1025 directs the generation of virtual servers and the allocation of the hardware components 1001 to the virtual servers. In the virtual server 1021a, one guest OS 1022 and one or more guest applications 1023 operate. Although only two virtual servers 1021a and 1021b are shown for convenience of the drawing, the present invention is not limited to the above; three or more, or only one are also permitted.

Figure 2:
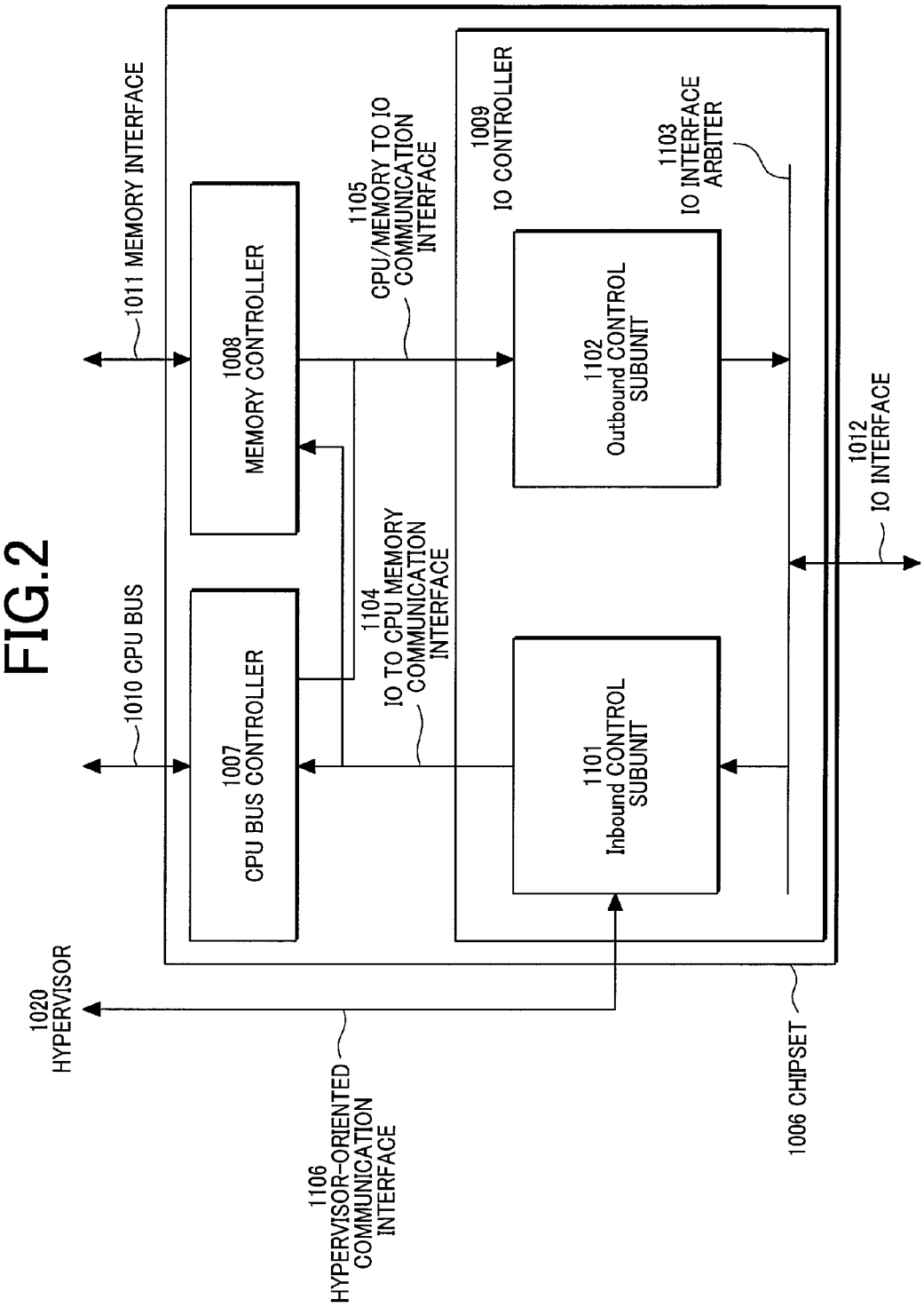
FIG. 2 is a block diagram showing the chipset structure of a computer shown in FIG. 1.

FIG. 2 shows an internal structure of the chipset 1006 of FIG. 1, and details, particularly, the periphery of the IO controller 1009. The IO controller 1009 is connected with the CPU bus controller 1007 and the memory controller 1008 through an IO to CPU/memory communication interface 1104 and a CPU/memory to IO communication interface 1105, respectively.

The IO controller 1009, which is internally divided into an inbound (receiving side) control subunit 1101 and an outbound (sending side) control subunit 1102, is connected with the IO interface 1012 through an IO interface arbiter 1103.

The inbound control subunit 1101 receives transactions (hereinafter simply referred to as Tx) from the IO interface 1012, and transfers them to the IO to CPU/memory communication interface 1104. In embodiments of the present invention described below, the inbound control subunit 1101 further communicates with the hypervisor 1020 through a hypervisor-oriented communication interface 1106. As methods of implementing the hypervisor-oriented communication interface 1106, plural implementations are possible, such as NMIO register, IO register, interrupt, data structure on the memory, and combinations of them. These implementation methods are not detailed here because they are technologies within a scope easily conceivable to hardware designers and hypervisor designers. The outbound control subunit 1102 receives Tx from the CPU/memory to IO communication interface 1105, and transfers it to the IO interface 1012.

Figure 3:
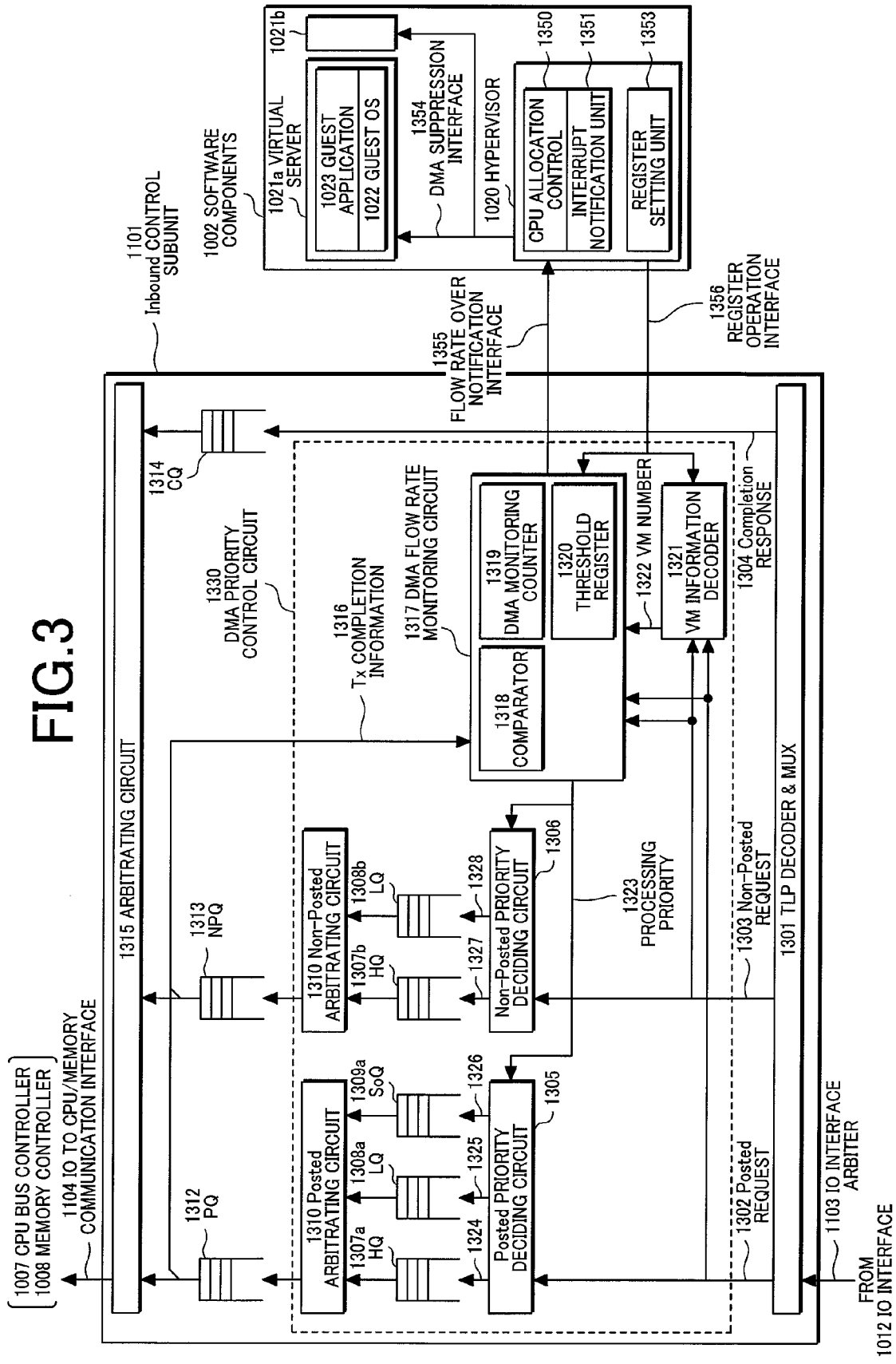
FIG. 3 is a block diagram showing the structure of main units of a first embodiment of the present invention.

FIG. 3 shows the structure of main units of the first embodiment, and discloses the internal structures of the inbound control subunit 1101 and the software components 1002. The above-described hypervisor-oriented communication interface 1106, which internally includes two interfaces, a flow rate over communication interface 1355 and a register operation interface 1356, connects the inbound control subunit 1101 and the hypervisor 1020. Information about virtual servers in which flow rate over occurs is transmitted from the flow rate over communication interface 1355.

The inbound control subunit 1101 receives Tx from the IO interface arbiter 1103 in a TLP (Transaction Layer Packet) decoder & MUX 1301. The TLP decoder & MUX 1301, which is a DMA receiving unit to receive DMA requests, classifies Tx received according to PCI express rules into three types, Posted request 1302, Non-Posted request 1303, and Completion request 1304. It is conceivable that Tx occupying most part of band control of IO access to be solved in this embodiment is DMA write requests and DMA read requests. Accordingly, a policy of the present invention is to subject the Posted request 1302 including a DMA write request and the Non-Posted request 1303 including a DMA read request to arbitration processing based on the priority of virtual servers.

The Posted request 1302 is stored in one of HQ (Higher-prioritized Queue) 1307a, LQ (Lower-prioritized Queue) 1308a, and SoQ (Strong-ordered Queue) 1309 via a posted priority deciding circuit 1305. The queues HQ 1307a, LQ 1308a, and SoQ 1309 have higher processing priority in that order.

On the other hand, the Non-Posted request 1303 is stored in one of HQ 1307b and LQ 1308b via a Non-Posted priority deciding circuit 1306. The queues HQ 1307b and LQ 1308b have higher processing priority in that order.

Any of the priority deciding circuits 1305 and 1306 to function as a priority deciding unit decides a storage destination of a received request according to the value of processing priority 1323 generated by the DMA flow rate monitoring circuit 1317. In this embodiment, when the value of the processing priority 1323 is 0, a low priority is assigned to received requests, and when 1, a high priority is assigned to them.

The DMA flow rate monitoring circuit 1317 decides processing priority 1323 according to the Posted request 1302 and the Non-Posted request 1303, a virtual server number (hereinafter referred to as a VM number of VM#) 1322 generated by the VM information decoder 1321, and information set from the hypervisor through the register operation interface 1356.

The VM information decoder 1321 consults the header of request Tx of the Posted request 1302 and the Non-Posted request 1303, and a value set by the register operation interface 1356 to locate a virtual serve corresponding to these requests, and outputs a VM number 1322. Plural methods are conceivable to implement the VM information decoder 1321 that functions as the virtual server locating unit. For example, part of address bits in the header of requests is regarded as a VM number, or a corresponding VM number is held for each address range, and it is checked for each Tx reception.

Several methods are conceivable to implement the DMA flow rate monitoring circuit 1317. Two implementation examples are described using FIGS. 4 and 6.

Figure 4:
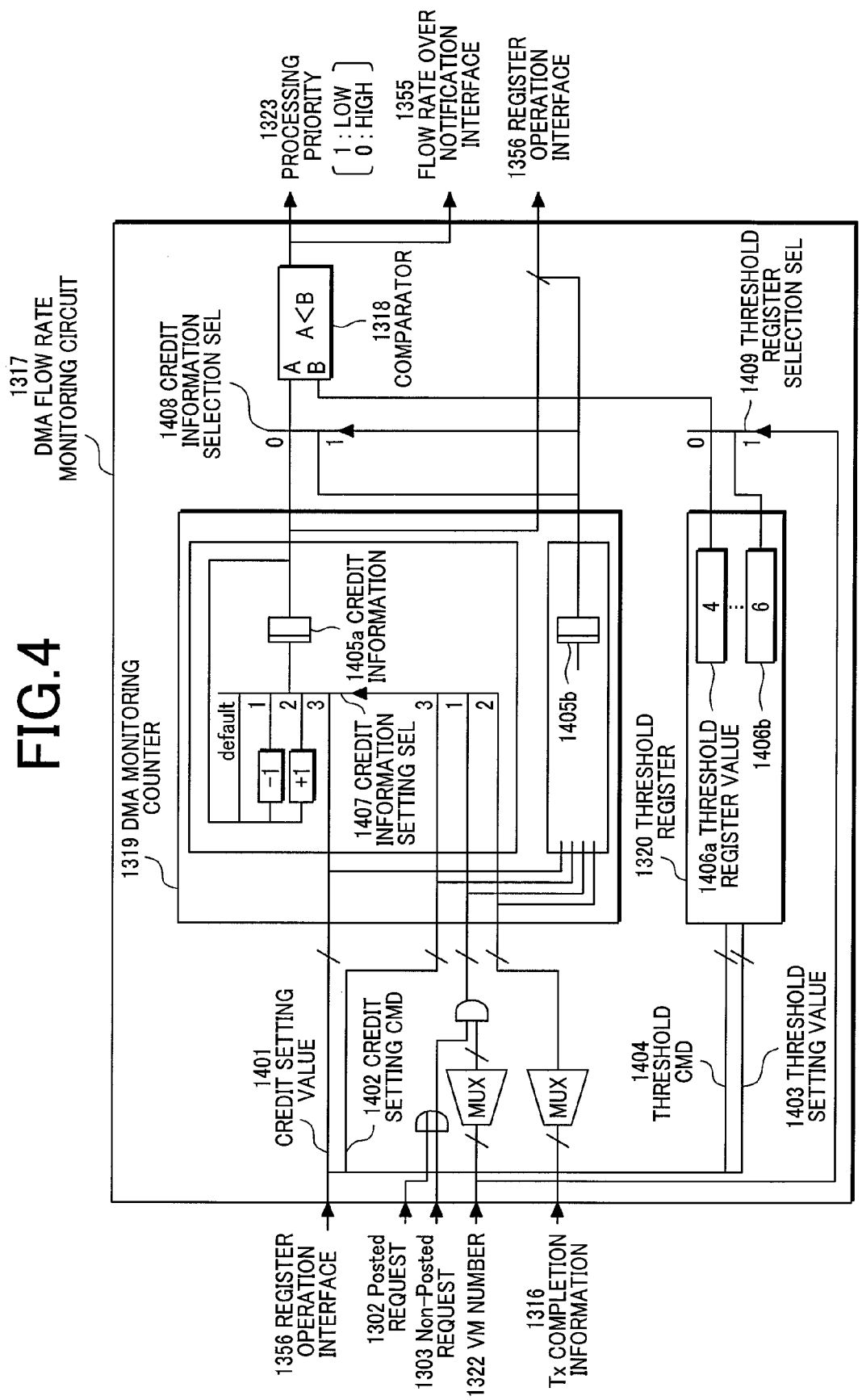
FIG. 4 is a block diagram showing a first example of implementing a DMA flow rate monitoring circuit in a first embodiment.

FIG. 4 shows a first example of implementing the DMA flow rate monitoring circuit 1317. In this example, the DMA flow rate monitoring circuit 1317 includes a DMA monitoring counter 1319, and holds credit information 1405a and 1405b indicating how many requests can be internally received subsequently, for each virtual server. Since each piece of information (latch) of the credit information 1405a and the credit information 1405*b*, and peripheral setting circuits are identical, only the credit information 1405*a* will be detailed.

The credit information is set from the hypervisor 1020 via credit setting CMD 1402 and a credit setting value 1401 that derives from the register operation interface 1356.

The credit information is decremented at the reception of each of the Posted request 1302 and the Non-Posted request 1303, and is incremented when Tx completion information 1316 indicating completion of processing of each request is asserted. Only one piece of the credit information is operated at the decrement and increment, and information corresponding to a virtual server located by a VM number 1322 is selectively operated.

When credit information setting by credit setting CMD 1402, and the above-described decrement and increment operations are not performed, credit information setting SEL 1407 selects default data, and previous credit information is kept. The credit information can, in any case, be read from the hypervisor 1020 via the register operation interface 1356.

The DMA flow rate monitoring circuit 1317 holds information on the number of DMAs that can preferentially be processed for each of virtual servers in threshold register values 1406*a* and 1406*b* in the threshold register 1320. The threshold register values 1406*a* and 1406*b* are provided for each of virtual servers, and are set from the hypervisor via threshold setting CMD 1404 and a threshold setting value 1403 that derives from the register operation interface 1356. In the drawing, a threshold value "4" is set in 1406*a*, and a threshold value "6" is set in 1406*b*.

The DMA flow rate monitoring circuit 1317 includes a comparator 1318 to compare credit information and a threshold register value. The credit information and the threshold register value to be compared are specified by a VM number 1322, and credit information selection SEL 1408 and threshold register selection SEL 1409 select the comparison target.

The comparator 1318 determines that, when the credit information is smaller than the threshold register value, an IO band set in a corresponding virtual server is exceeded. The reason is that the number of DMA processings in progress increases as a result of reception into more than an estimated value, so that credit may have become smaller than estimation. In this case, 1 is asserted to the processing priority 1323 and the received request is stored in a queue of lower priority. At the same time when a low priority is selected as the proper priority, the flow rate over notification interface 1355 is asserted to notify the hypervisor 1020 that any virtual server has exceeded an IO band. In the circuit configuration of FIG. 4, although only the flow rate over communication interface 1355 asserted is shown in the drawing, as described previously, the virtual server number (VM number 1322) of a corresponding virtual server number is transmitted to the hypervisor 1020 via the interface 1355 at the same time as the assertion. The implementation method is not detailed here because it is technology within a range easily conceivable to hardware designers.

On the other hand, when the credit information is equal to or greater than the threshold register value in the comparator 1318, the comparator 1318 determines that the IO band set in the corresponding virtual server is not exceeded. In this case, 0 is outputted to the processing priority 1323, and the received request is stored in a queue of higher priority.

Figure 6:
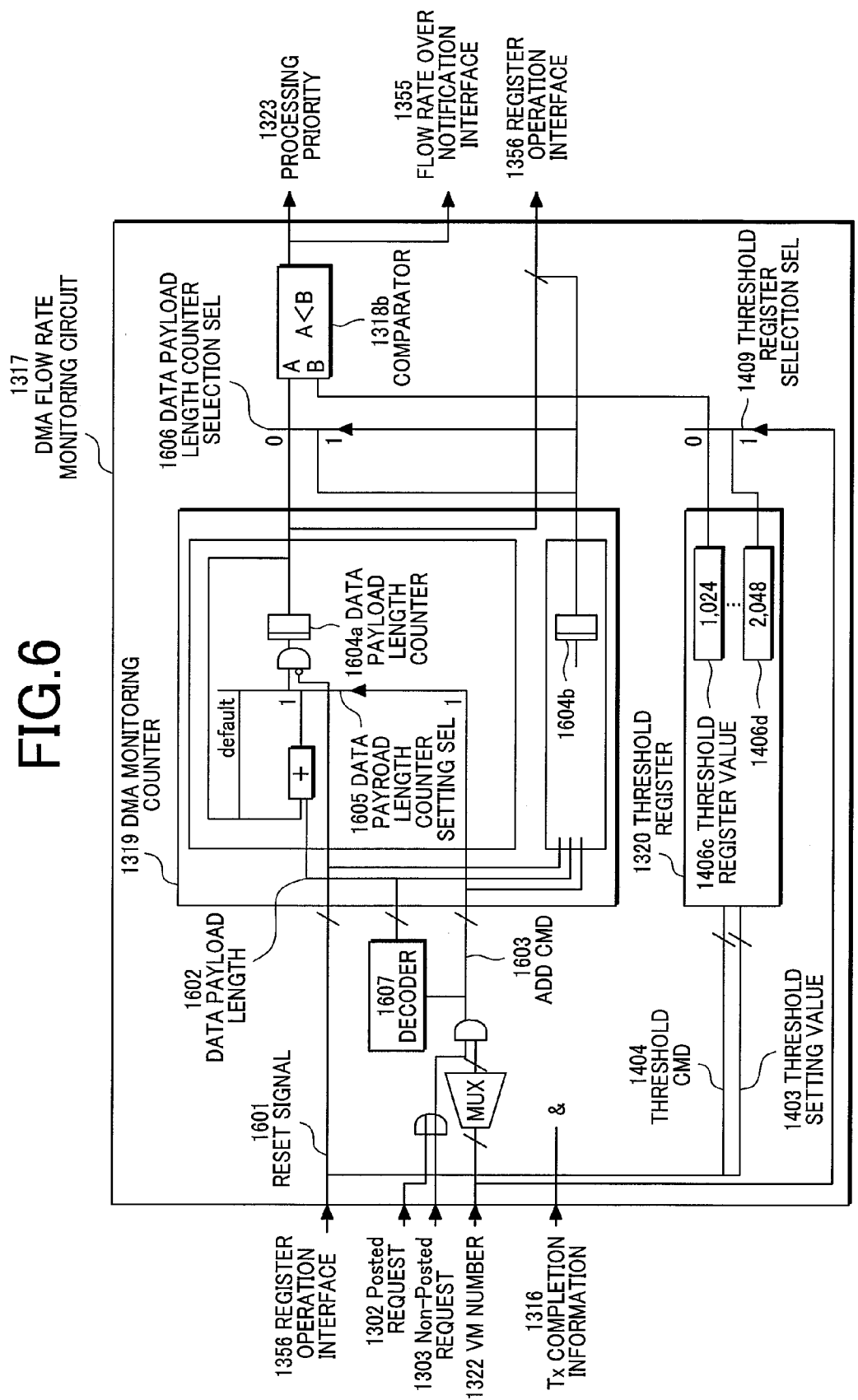
FIG. 6 is a block diagram showing a second example of implementing a DMA flow rate monitoring circuit in a first embodiment.

FIG. 6 shows a second example of implementing the DMA flow rate monitoring circuit. In this example, the DMA monitoring counter 1319 includes data payload length counters 1604*a* and 1604*b*, and holds the accumulated value of payload lengths of received requests including DMAs having been already processed for each of virtual servers.

The data payload length counters 1604*a* and 1604*b* can be reset from the hypervisor 1020 via a reset signal 1601. The hypervisor 1020, the structure of which is described in FIG. 7, periodically resets the counter and monitors DMA request amounts received per unit time.

The data payload length counters 1604*a* and 1604*b* are counted up at reception of the requests 1302 and 1303. An added value is data payload length included in the Tx header of the requests 1302 and 1303, and determined by a decoder 1607. When the requests 1302 and 1303 are asserted, add CMD 1603 is asserted corresponding to a VM number 1322, and the data payload length counter 1604*a* or 1604*b* is added. When the add CMD 1603 is not asserted, previous information is kept.

In the example of FIG. 6, the accumulated value of DMA payload length that can be preferentially processed is held in the threshold register values 1406*c* and 1406*d* in units of DW (Double Word: 4 byte). In FIG. 6, 1024 is stored in the threshold register 1406*c*, and 2,048 is stored in the threshold register 1406*d*, respectively indicating that DMA requests of up to 1024 DW (4 KB) and 2048 DW (8 KB) can be preferentially processed.

A comparator 1318*b* determines, when the value of the data payload length counter is greater than the threshold register value, that IO band set in a corresponding virtual server is exceeded. In other cases, it determines that IO band is not exceeded. The assertion of the processing priority 1323 and the flow rate over communication interface 1355 is the same as that of the first example shown in FIG. 4.

The examples of implementing the DMA flow rate monitoring circuit by use of FIG. 4 and FIG. 6 are as described above. It has been shown that the monitoring of DMA flow rate occupying the most part of IO band can be performed according to threshold values set for each of virtual servers by using any of the methods described in the examples. As conceivable variants of the DMA flow rate monitoring circuit, threshold data is increased to output priority of plural levels, DMA flow rate is determined using data credit, and a data payload length counter is periodically reset only within the DMA flow rate monitoring circuit 1317. However, any of these variants are easily inferable to circuit designers and hypervisor designer from the descriptions of the above-described implementation examples, and therefore are not described here.

Figure 5:
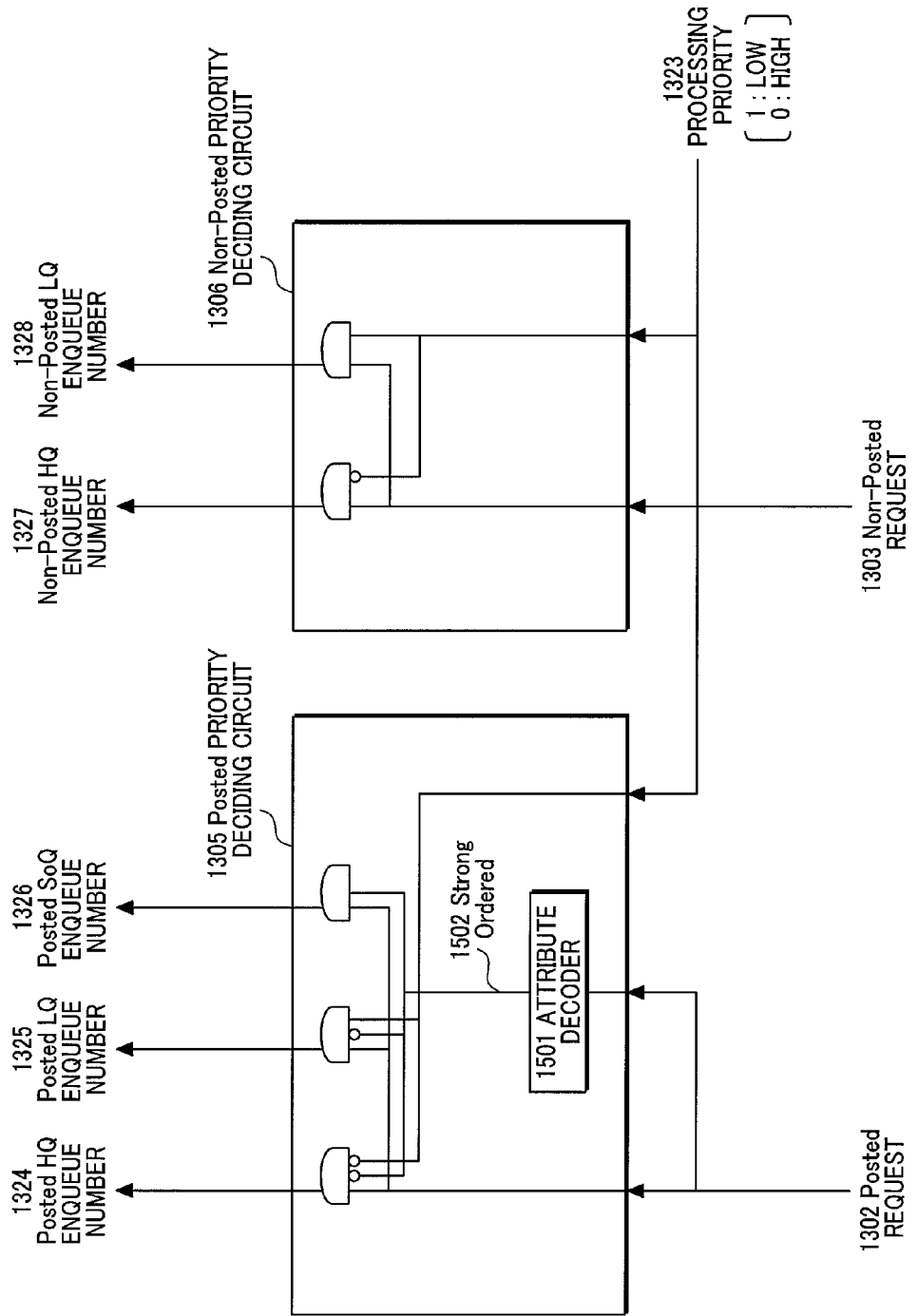
FIG. 5 is a block diagram showing an example of a Posted/Non-Posted priority deciding circuit in a first embodiment.

With reference to FIG. 5, the following describes an example of implementing the Posted/Non-Posted priority deciding circuits 1305 and 1306 being the priority deciding unit of FIG. 3. The Posted request 1302 is assigned three levels of priority according to the type of request and the processing priority 1323, and enqueued in different queues according to the levels. The priority is decided by the Posted priority deciding circuit 1305.

The Posted priority deciding circuit 1305 decodes a received request by an attribute decoder 1501 to determine whether Strong Ordered attribute is specified. The PCI express protocol states that Posted requests with Strong Ordered attribute specified must not overtake any preceding Posted requests. Accordingly, when a Posted request with Strong Ordered specified is received, a Strong Ordered signal 1502 is asserted. By this signal, a Posted SoQ enqueue signal 1326 is asserted regardless of the processing priority 1323, and the received Posted request 1302 is enqueued in the SoQ 1309 of a subsequent stage.

When the Strong Ordered signal 1502 is not asserted, an enqueue signal 1324 or 1325 is asserted according to the processing priority 1323. When the processing priority 1323 is 0, that is, when priority is high, an Posted HQ enqueue signal 1324 is asserted, and the received Posted request 1302 is stored in HQ 1307*a* of subsequent stage. On the other hand, when the processing priority 1323 is 1, that is, when priority is low, the Posted LQ enqueue signal 1324 is asserted, and the received Posted request 1302 is enqueued in LQ 1308*a* of subsequent stage.

On the other hand, the Non-Posted request 1303 is assigned two levels of priority according to the processing priority 1323, and is enqueued in different queues according to the levels. The priority is decided by the Non-Posted priority deciding circuit 1306. In the Non-Posted priority deciding circuit 1306, an enqueue signal 1327 or 1328 is asserted according to the processing priority 1323. When the processing priority 1323 is 0, that is, when priority is high, a Non-Posted HQ enqueue signal 1327 is asserted, and the received Non-Posted request 1303 is stored in HQ 1307*b* of subsequent stage. On the other hand, when the processing priority 1323 is 1, that is, when priority is low, the Non-Posted LQ enqueue signal 1328 is asserted, and the received Non-Posted request 1303 is enqueued in LQ 1308*b* of subsequent stage.

The Posted request enqueued in each of the queues 1307*a*, 1308*a*, and 1309, and the Non-Posted request enqueued in each of the queues 1307*b* and 1308*b* are processed in order via the Posted arbitrating circuit 1310, and the Non-Posted arbitrating circuit 1311, respectively, and are enqueued in PQ 1312 and NPQ 1313.

The Posted arbitrating circuit 1310 preferentially processes 1307*a*, 1308*a*, and 1309 in that order. This priority level is fixed. On the other hand, the Non-Posted arbitrating circuit 1311 preferentially processes 1307*b* and 1308*b* in that order, and the priority level is fixed. Tx stored in the PQ 1312, NPQ 1313, and CQ 1314 is sent to the IO to CPU/memory communication interface 1104 via the arbitrating circuit 1315.

Figure 14:
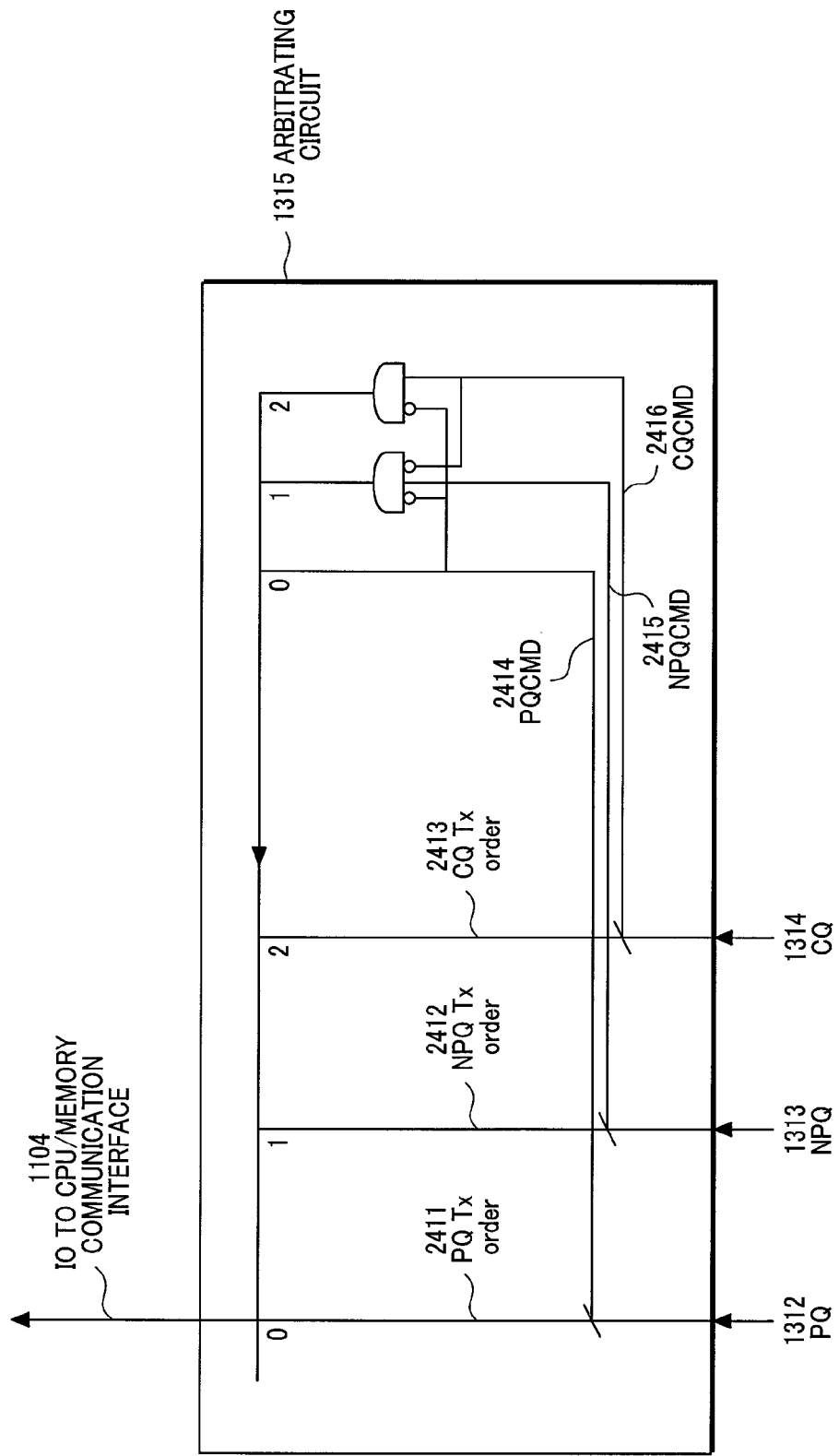
FIG. 14 is a block diagram showing an embodiment of an arbitrating circuit in a third embodiment.

FIG. 14 shows an example of the arbitrating circuit 1315. the arbitrating circuit preferentially sends out Tx from the PQ 1312, CQ 1314, and NPQ 1313 in that order, and complies with the PCI express. Confirm that combinations with the priority levels of the arbitrating circuits 1310 and 1311 described previously do not violate the PCI express ordering rules.

After the completion of Tx issued from the PQ 1312 and NPQ 1313, Tx completion information 1316 is asserted and passed to the DMA flow rate monitoring circuit 1317.

In the first embodiment described above, the processing priority of Posted request is set to three levels, and the processing priority of Non-Posted request is set to two levels. However, any of them can be set to any number of two levels or more. Specifically, conceivable constructions are to share the LQ 1308*a* and SoQ 1309 for processing at priority of two levels to reduce a required circuit scale, or to perform more detailed priority control by dividing the threshold register 1320 into plural sections to output the processing priority 1323 at plural levels. Since any of the constructions is easily inferable to circuit designers, their descriptions are omitted here.

The following describes the internal structure of the software components 1002 at the right side of FIG. 3 relating to the first embodiment. The hypervisor 1020 internally includes a CPU allocation control (unit) 1350, an interrupt notifying unit 1351, and a register setting unit 1353. These functional blocks respectively control allocation of CPU time to the virtual servers 1021*a* and 1021*b*, notify the virtual servers 1021*a* and 1021*b* of virtual interrupts, and set and consult registers of the DMA flow rate monitoring circuit 1317 and the VM information decoder 1321 in a DMA priority control circuit 1330.

Figure 7:
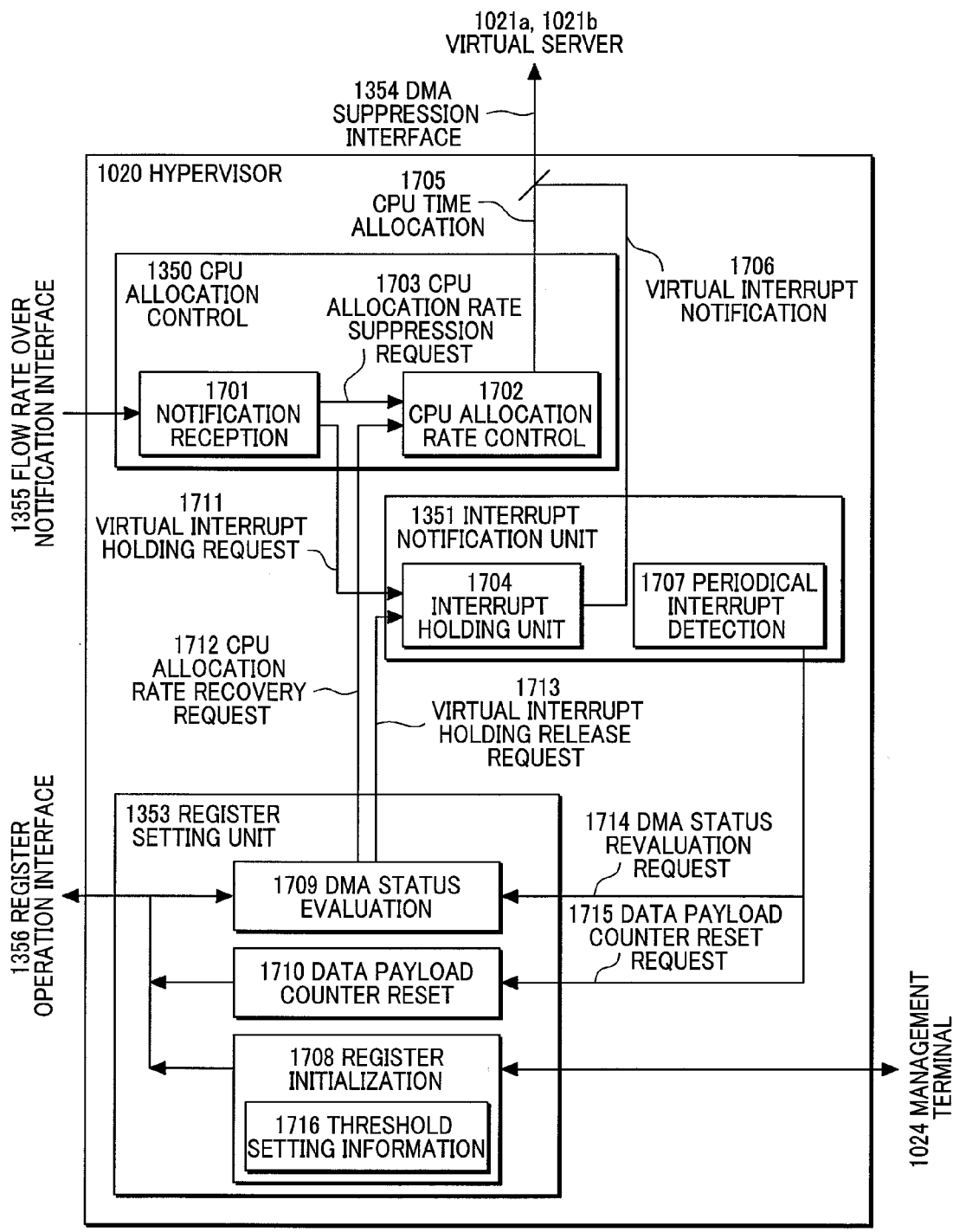
FIG. 7 is a block diagram showing a hypervisor structure in a first embodiment.

FIG. 7 shows an example of the internal functional structure of the hypervisor of the present invention. The hypervisor 1020 internally includes a CPU allocation control 1350, an interrupt notification unit 1351, and a register setting unit 1353. The CPU allocation control 1350 internally includes a notification reception 1701 and a CPU allocation rate control 1702. The notification reception 1701, when an IO band allocated to virtual servers is exceeded, receives notification from the flow rate over communication interface 1355 and information about a corresponding virtual server. The notification reception 1701 suppresses DMA issuance to corresponding virtual servers 1021*a* and 1021*b* via a CPU allocation rate control request 1703 and a virtual interrupt holding request 1711.

The CPU allocation rate control 1702 controls CPU time allocated to the virtual servers 1021*a* and 1021*b* via the CPU time allocation 1705. The CPU time allocation 1705 assumes an execution start instruction and interrupt operation of OS code on the virtual servers, such as VMEntry and VMExit in Intel's virtual-server-oriented technology VT-x (Intel® virtualization Technology Specification for the IA-32 Intel® Architecture). The CPU allocation rate control 1702, when receiving a CPU allocation rate control request 1703, decreases CPU time allocation rate to a relevant virtual server. For example, virtual 50% of CPU time assigned to servers during initial setting is decreased to 10%.

The interrupt notification unit 1351 internally includes an interrupt holding unit 1704 and an interrupt detection 1707. The interrupt holding unit 1704 controls virtual interrupt report to virtual servers, and starts an interrupt handler of the guest OS 1022 via a virtual interrupt notification 1706. The virtual interrupt notification 1706 calls the interrupt handler of an OS on a virtual serve, such as an Event Injection function in the VT-x specification described above, and functions in conjunction with VMEntry execution by the above-mentioned CPU time allocation 1705. The interrupt holding unit 1704, when receiving the virtual interrupt holding request 1711, temporarily holds the notification of a virtual interrupt to a relevant virtual server.

The CPU time allocation 1705 and the virtual interrupt notification 1706 are collectively referred to as a DMA suppression interface 1354. By operating the interface, the decrease of CPU time allocated to the virtual servers and virtual interrupt report are held, and a DMA request issued by the guest OS 1022 is suppressed. This processing decreases IO band used by a relevant virtual server and eliminates the excess of predetermined threshold values.

The periodical interrupt detection 1707 is a module that is periodically started and issues a DMA status reevaluation request 1714 and a data payload counter reset request 1715. There are plural methods for realizing periodical start; by using as a trigger timer interrupt from hardware such as PIT (Programmable Interval Timer) and RTC (Real Time Clock), and by monitoring a time stamp counter (TSC) within a CPU for polling. Any of them may be adopted.

The following describes a structure for releasing the suppression of DMA requests in the hypervisor 1020 of FIG. 7. The register setting part 1353 internally includes a DMA status evaluation 1709, a data payload counter reset 1710, and a register initialization 1708.

The DMA status evaluation 1709, on receiving a DMA status revaluation request 1714 periodically issued from the periodical interrupt detection 1707, evaluates IO bands used by virtual servers, and issues a request to release DMA suppression to a virtual server in which the excess of IO band used has been eliminated. To evaluate IO bands, the DMA status evaluation 1709 reads the DMA monitoring counter 1319 via the register operation interface 1356, and compares it with threshold set up information 1716 described later. The comparison is performed in the same way as the comparison processings 1318 and 1318*b* described previously.

The DMA status evaluation 1709, to release DMA suppression, issues a CPU allocation rate recovery request 1712 and a virtual interrupt holding release request 1713. On receiving the requests, the CPU allocation rate control 1702 and the interrupt holding unit 1704 recover the allocation rate of decreased CPU time and restarts the notification of held virtual interrupts, respectively. By this processing, DMA requests by the guest OS 1022 can be restarted.

The data payload counter reset 1710 is used when the second example of the DMA flow rate monitoring circuit described in FIG. 6 is adopted. Triggered by a data payload counter reset request 1715 periodically issued from the periodical interrupt detection 1707, the data payload counter reset 1710 resets the data payload length counters 1604*a* and 1604*b* described previously. By this processing, when the data payload counter reset request 1715 is issued, for example, every 1 ms, the threshold register values 1406*c* and 1406*d* described in FIG. 6 permit preferential use of IO band of 4 MB per second and 8 MB per second, respectively.

The register initialization unit 1708 is a module for initializing the above-described DMA monitoring counter 1319 and threshold register 1320, and internally includes a threshold setting information 1716. The threshold setting information 1716 is specified by the manager through the management terminal 1024. An example of a user interface displayed in the management terminal 1024 is described later using FIG. 10.

Figure 8:
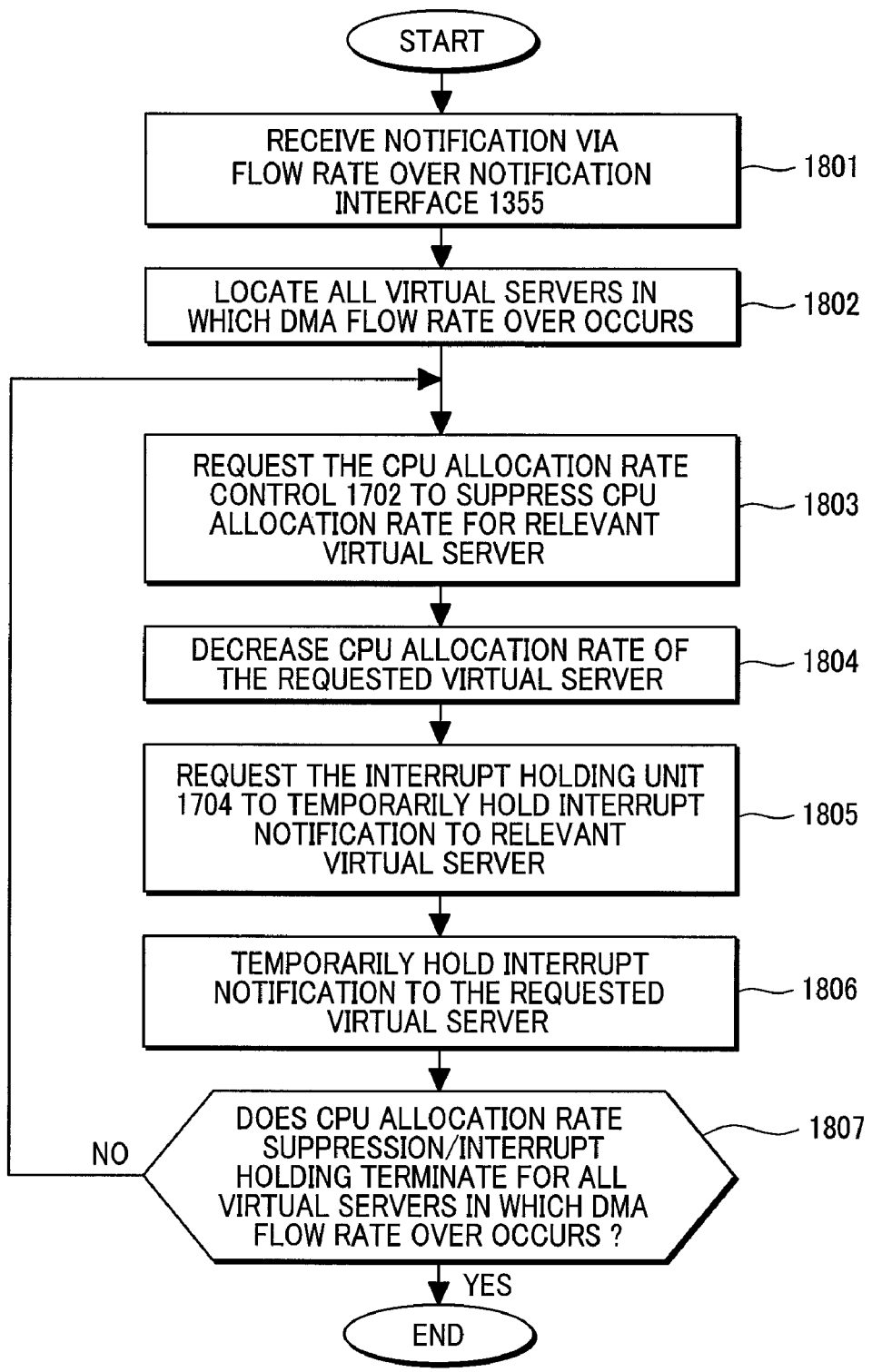
FIG. 8 is a flowchart drawing showing the flow of processing in hypervisor operation at notification of DMA flow rate over in a first embodiment.

With reference to a flowchart of FIG. 8, the operation of the hypervisor 1020 at DMA flow rate over notification in the first embodiment is described.

Step 1801 receives notification via the flow rate over notification interface 1355. As described above, the interface includes virtual server information (VM number) with a proper priority selected, and all virtual servers in which DMA flow rate over occurs can be located in Step 1802, based on the information.

Step 1803 requests the CPU allocation rate control 1702 to suppress a CPU allocation rate to relevant virtual servers.

In Step 1804, the CPU allocation rate control 1702 decreases a CPU allocation rate of the requested virtual servers.

Step 1805 requests the Interrupt holding unit 1704 to temporarily hold interrupt notification to the relevant virtual servers.

In Step 1806, the interrupt holding unit 1704 temporarily holds interrupt notification to the requested virtual serves.

Step 1807 confirms whether all virtual servers in which DMA flow rate over occurs have completed the CPU allocation rate suppression and interrupt holding processing shown in Steps 1803 to 1806. Otherwise, Step 1807 directs residual virtual servers to perform again the processings of Steps 1803 to 1806. When the processings have been completed, the processings shown in this flowchart are terminated.

Figure 9:
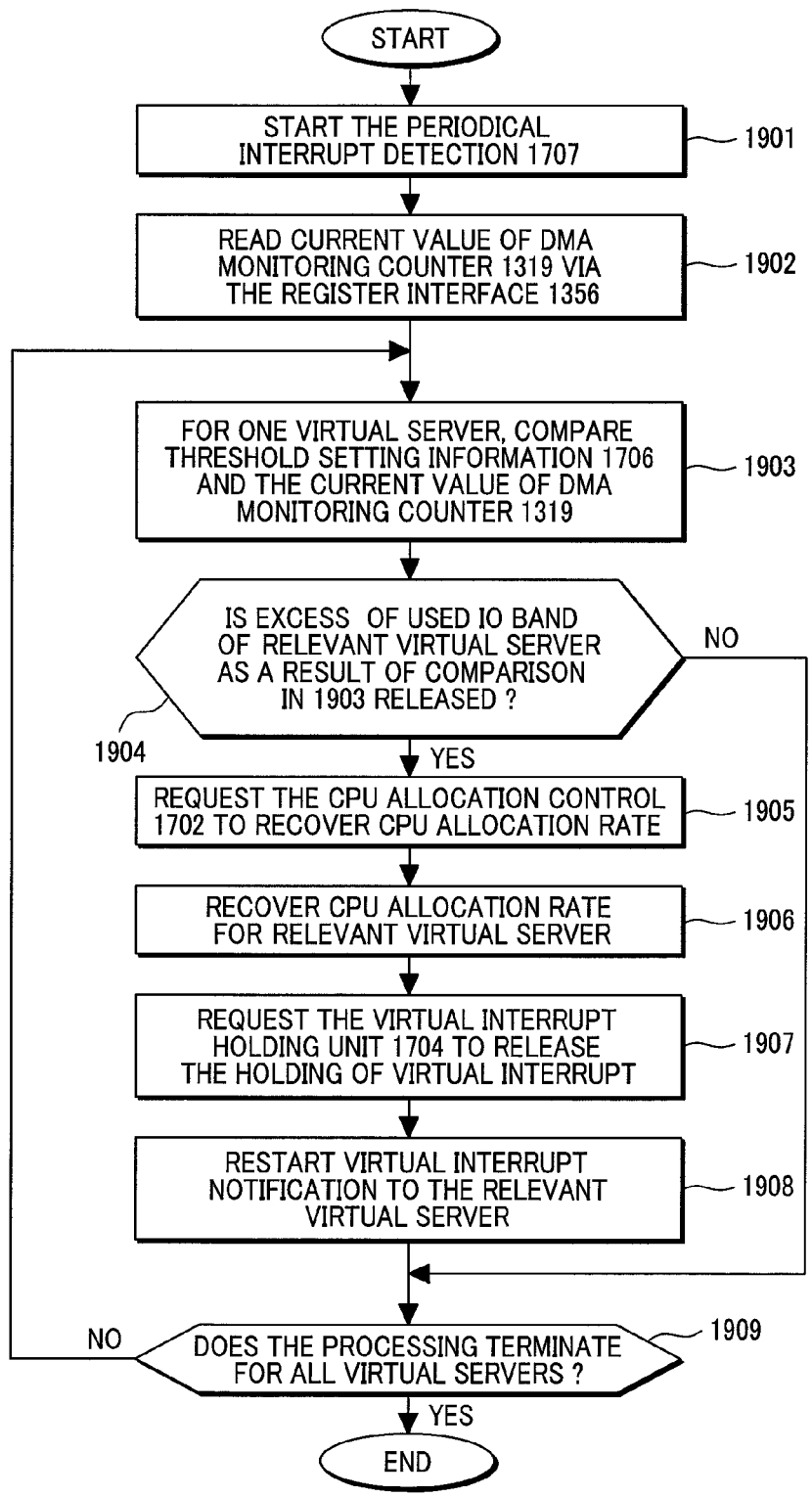
FIG. 9 is a flowchart showing the flow of processing in DMA flow rate over release operation in a first embodiment.

With reference to the flowchart of FIG. 9, the following describes the operation of the hypervisor 1020 at the release of DMA flow rate over in the first embodiment.

Step 1901 starts the periodical interrupt detection 1707.

Step 1902 reads a current value of the DMA monitoring counter 1319 via the register interface 1356.

Step 1903 compares the threshold setting information 1706 and a current value of the DMA monitoring counter 1319 for one virtual server.

Step 1904 branches processing according to a comparison result of Step 1903. That is, when the excess of IO band used by the virtual server is not released, control branches to Step 1909; when released, control goes to Step 1905.

Steps 1905 to 1908 perform the release of DMA suppression for the server.

Step 1905 requests the CPU allocation control 1702 to recover CPU allocation rate.

In Step 1906, the CPU allocation control 1702 that has received the request recovers CPU allocation rate of the virtual server. For example, the virtual server with CPU allocation rate suppressed to 10% is recovered to an initial setting value, e.g., 50%.

Step 1907 requests the virtual interrupt holding unit 1704 to release the holding of virtual interrupts.

In Step 1908, the virtual interrupt holding unit 1704 that has received the request restarts virtual interrupt notification to the virtual server.

Step 1909 determines whether the processings in Steps 1903 to 1908 have been completed for all the virtual servers. When not completed, the processings in Steps 1903 to 1908 are performed again for residual virtual servers. When completed, the processing shown in the flowchart is terminated.

Figure 10:
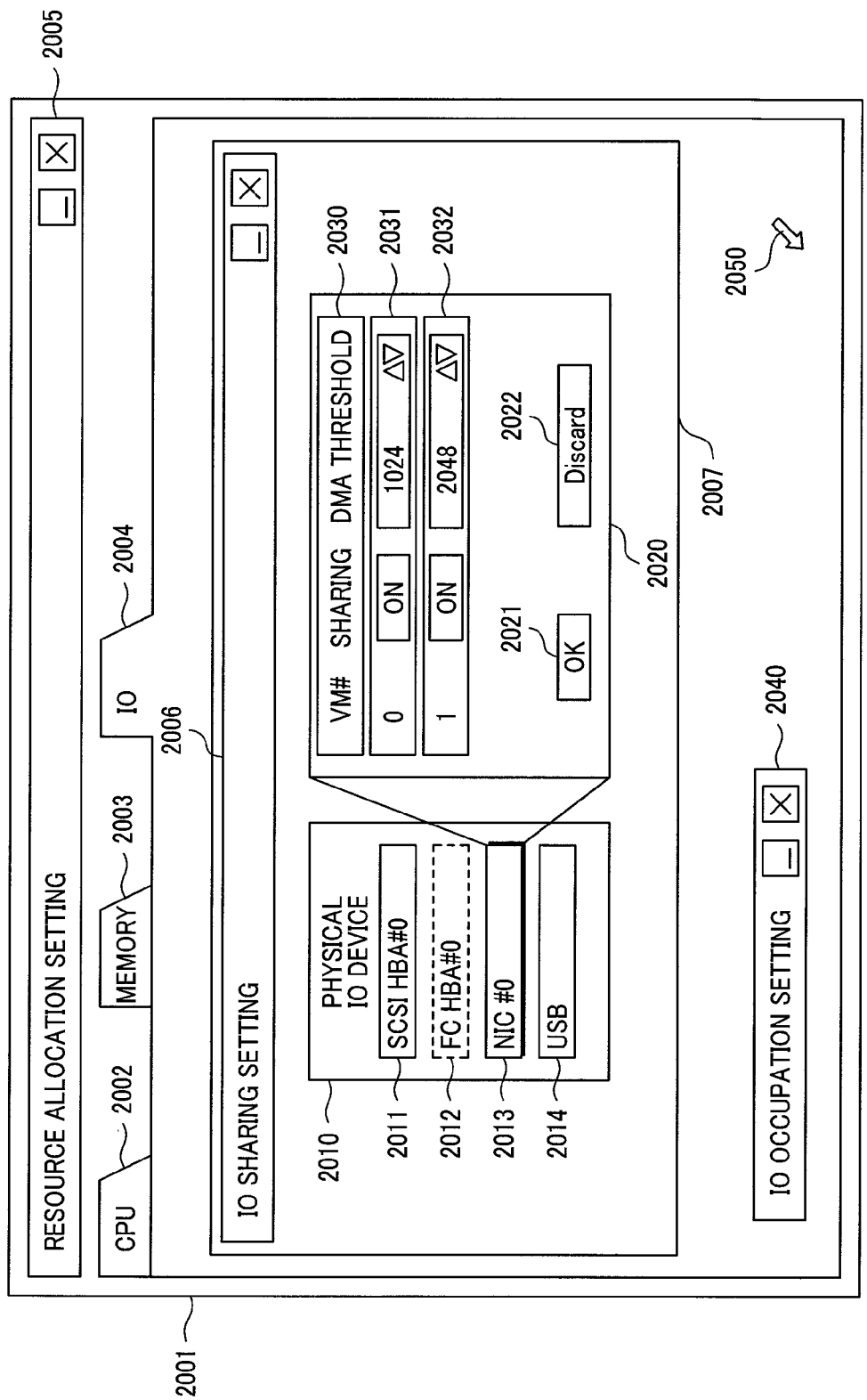
FIG. 10 is a drawing showing an example of a user interface in a first embodiment.

FIG. 10 shows an example of a user interface displayed in the management terminal 1024 shown in FIG. 1. The user interface shown by this drawing intends GUI (Graphical User Interface) using CRT (Cathode Ray Tube) and WWW (World Wide Web) browser and the like, and assumes operations using a mouse pointer 2050. However, it goes without saying that interfaces having the same setting items, even CLI (Command Line Interface), can be installed.

In FIG. 10, 2001 is a resource allocation setting window that directs virtual servers to allocate computer resources. This window includes a resource allocation setting window operation bar 2005, a CPU allocation setting tab 2002, a memory allocation setting tab 2003, and IO allocation setting tab 2004. The operation bar 2005 is used to direct the iconifying and end of the resource allocation setting window itself 2001. 2002 indicates a tab for directing allocation of CPU resources to virtual servers, 2003 indicates a tab for directing allocation of memory resources, and 2004 is a tab for directing allocation of IO resources. In the drawing, an IO allocation setting tab 2004 is selected.

Hereinafter, the IO allocation setting tab 2004 that deals with IO resource allocation most related to this embodiment will be detailed. The IO allocation setting tab 2004 includes an IO sharing setting window 2007 and an IO device occupation setting window operation bar 2040. The IO sharing setting window 2007 is a window for setting virtual servers to be used in common for each physical IO device. The IO device occupation setting window operation bar 2040 indicates a state in which a window is iconified; its detailed description is omitted.

The IO sharing setting window 2007 includes an IO sharing setting window operation bar 2006, a physical IO device sharing status confirmation window 2010, and a NIC#0 sharing setting window 2020. The physical IO device sharing status confirmation window 2010 displays a list of ready physical IO devices. FIG. 10 shows that SCSI HBA#0 2011, FC HBA#0 2012, NIC#0 2013, and USB 2014 are ready for use. FC HBA#0 2012 is enclosed by a dotted line to indicate that it is being exclusively used by any virtual server. It cannot be operated within the window. In FIG. 10, NIC#0 2013 within the window 2010 is displayed by a shaded list frame to indicate that it has been selected, and detailed setting of NIC#0 2013 can be performed in the NIC#0 shared setting window 2020.

The NIC#0 sharing setting window 2020 includes IO shared information title line 2030, NIC#0 sharing setting 2031 to virtual server #0, NIC#0 sharing setting 2032 to virtual server #1, change approval button 2021, and change cancel button 2022. The manager changes elements within the NIC#0 sharing setting 2031 to virtual server #0 and the NIC#0 sharing setting 2032 to virtual server #1, then clicks the change approval button 2021, and thereby can change sharing settings among virtual servers. If the changes are incorrect, change contents can be canceled by clicking the change cancel button 2022.

For NIC#0 sharing setting 2031 to virtual server #0 and NIC#0 sharing setting 2032 to virtual server #1, corresponding virtual server numbers (VM#) are displayed respectively so that sharing on/off and DMA threshold can be set. The sharing field is a pull-down menu for setting whether a virtual server shares a relevant device (NIC#0 2013 in the example of FIG. 10).

The DMA threshold field allows a user to set a preferentially usable IO band in the form of DMA threshold when using the relevant device. The example of FIG. 10 shows setting values when the payload counters 1604a and 1604b shown in FIG. 6 are used; 1024 is set for the counter 1604a corresponding to VM#0, and 2,048 is set for the counter 1604b corresponding to VM#1. In the setting field, by selecting a pair of upper-facing and lower-facing rectangular buttons by a mouse pointer 2050, setting values can be increased or decreased.

Although a DMA threshold value is directly set by the user in the user interface example of FIG. 10, other highly readable indexes may be set as an alternative method. For example, a preferentially usable IO band may be directly set by a number such as "MB (MB/s)". In this case, the DMA setting counter 1319 finally set must be set without contradiction. However, this is control easily inferable from the descriptions of the above embodiments, and detailed descriptions are omitted.

Second Embodiment

The following a second embodiment. This embodiment achieves a capping function to prohibit DMA requests Consuming more IO band than specified by allocating virtual channels (VC) to virtual servers.

Figure 11:
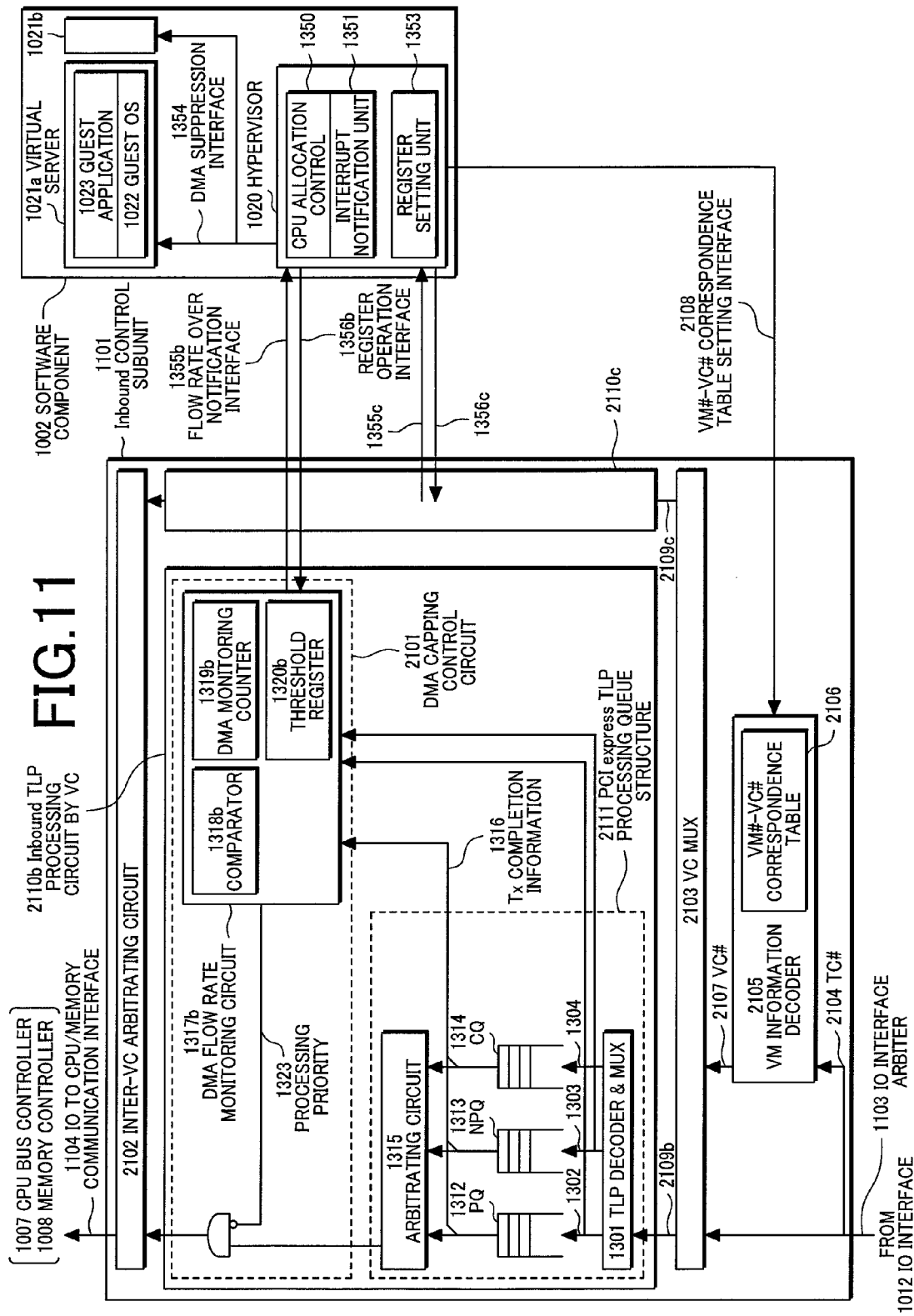
FIG. 11 is a block diagram showing the structure of a second embodiment of the present invention.

FIG. 11 shows the structure of main units of the second embodiment of the present invention, that is, the internal structure of the inbound control subunit 1101 and the software components 1002. The inbound control subunit 1101 allocates one VC to one virtual server to make the control structure of Tx processing independent for each of virtual servers. Therefore, the unit 1101 internally includes a VC-specific inbound TLP processing circuits 2110b and 2110c, as well as a VC MUX 2103, and an inter-VC arbitrating circuit 2102, and VM information decoder 2105.

The VM information decoder 2105 receives TC# (Traffic Class) 2104 of the header of Tx received from the IO interface arbiter 1103, and then locates VC# 2107 according to information of the W#-VC# correspondence table 2106. The VM#-VC# correspondence 2106 is set from the hypervisor 1020 via the W#-VC# correspondence table setting interface 2108. The VM#-VC# correspondence table setting interface 2108 may be shared with the register operation interfaces 1356b and 1356c.

FIG. 12 shows an example of the data structure of VM#-VC# correspondence table 2106. In this embodiment, a virtual server number (VM#) and TC# are stored in coincidence in one column. In this data structure, Tx of TC#(=VM#)=0 is associated with VC#0 by information of a line of VC# corresponding to a virtual server #0 2200, Tx of TC#(=VM#)=1 is associated with VC#1 by information of a line of VC# corresponding to a virtual server #1 2201.

The VC MUX 2103 decides a transfer destination of Tx received according to the value of VC# 2107. Specifically, when VC# 2107=0, the VC-specific TLP reception interface 2109b is asserted, and when VC# 2107=1, the VC-specific TLP reception interface 2109c is asserted.

The VC-specific inbound TLP processing circuits 2110b and 2110c include a DMA capping control circuit 2101 that primarily functions as a PCI express TLP processing queue structure 2111 and a DMA capping unit. The PCI express TLP processing queue structure 2111 performs priority control according to the PCI express rules. Since the internal components of the PCI express TLP processing queue 2111 has already been described, its description is omitted here.

The DMA capping control circuit 2101 decides whether to permit the issuance of Tx outputted from the PCI express TLP processing queue structure 2111 according to processing priority 1323 outputted from a DMA flow rate monitoring circuit 1317b. Specifically, when the processing priority 1323 is 1 (low priority), it suppresses the issuance of Tx, and when 0 (high priority), it permits the issuance of Tx. By this processing, as long as the excess of an IO band set in the virtual server is not eliminated, a new DMA request cannot be issued. Thus, the capping function is implemented. The structure of the DMA flow rate monitoring circuit 1317b conforms to the structure shown in the examples 1 and 2 of the DMA flow rate monitoring circuit in FIGS. 4 and 6, and its detailed description is omitted here.

The inter-VC arbitrating circuit 2102 arbitrates Tx issued from the VC-specific inbound TLP processing circuits 2110b and 2110c, and sends it to the IO to CPU/memory communication interface 1104. This arbitrating circuit provides no priority for processing between VCs, and performs fair arbitration such as round robin. Possible suppression of the issuance of new DMA because of the excess of an IO band in an arbitrary virtual server by this processing would not interfere with DMA of other virtual servers.

Third Embodiment

The following describes a third embodiment. In this embodiment, virtual-server-specific IO band control is performed not in IO controllers but in IO devices.

Figure 13:
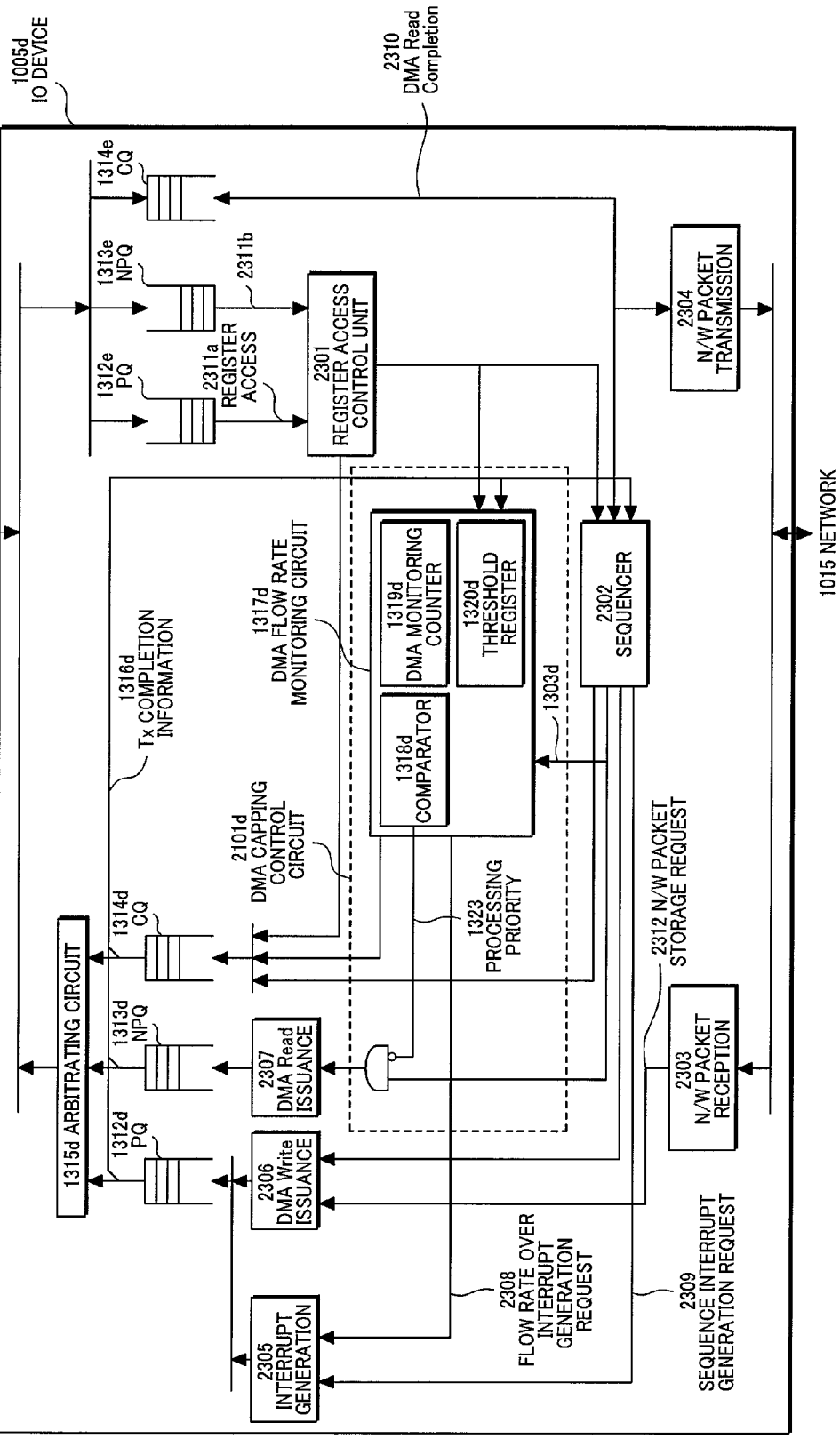
FIG. 13 is a block diagram showing the structure of a third embodiment of the present invention.

FIG. 13 shows an internal structure of an IO device 1005d in this embodiment. FIG. 13 assumes NIC (Network Interface Card), which is connected to the outside through the IO interface 1012 and the network 1015.

The IO device 1005d includes an arbitrating circuit 1315d for PQ 1312d, NPQ 1313d, and CQ 1314d that transmit Tx to the IO interface 1012, and includes PQ 1312e, NPQ 1313e, and CQ 1314e that receive Tx from the IO interface 1012. It also includes N/W packet transmission 230 that transmits packets to the network 1015, and N/W packet reception 2303 that receives packet.

In this embodiment, a DMA capping control circuit 2101d is provided as a component that controls IO bands. The DMA capping control circuit 2101d internally includes a DMA flow rate monitoring circuit 1317d and an AND element that decides whether to permit a request to a DMA Read issuance 2307. The DMA flow rate monitoring circuit 1317b conforms to the DMA flow rate monitoring circuits 1317 and 1317b in the first and second embodiments, and its detailed description is omitted here.

The DMA capping control circuit 2101d decides whether to permit the issuance of a Non-Posted request 1303d directed for issuance by the sequencer 2302 by specifying the processing priority 1323. The processing priority 1323 is asserted from the DMA flow rate monitoring circuit 1317d in the control circuit 2101d, and when it is 1 (low priority), a request to the DMA Read issuance 2307 is suppressed; when 0 (high priority), the issuance of a request to the DMA Read issuance 2307 is permitted. By this circuit, when an IO band set for each of virtual servers is exceeded, the issuance of the DMA Read request is prohibited, so that capping can be realized.

Since processing cannot be discontinued for N/W packet storage requests 2312 issued from the N/W packet reception 2303, capping by the processing priority 1323 is not applied.

When detecting the excess of an IO band, the DMA flow rate monitoring circuit 1317d asserts a flow rate over interrupt generation request 2308. This request is converted into an interrupt Tx in the interrupt generation 2305, and finally passed to the hypervisor 1020. Processing in the hypervisor is the same as that at reception of a request from the above-described flow rate over communication interface 1355.

The sequencer 2302, which controls the entire IO device 1005d, receives requests from the register access control unit 2301, Tx completion information 1316d, and DMA Read Completion 2310, and performs the issuance of Non-Posted request 1303d and the assertion of a sequencer interrupt request 2309.

The Non-Posted request 1303d is chiefly asserted upon packet transmission from the guest OS 1022, for the IO interface 1012, a DMA read request is sent and DMA Read Completion 2310 is received, and finally, the N/W packet transmission 2304 operates.

The sequencer interrupt generation request 2309 is a signal asserted upon the completion of the request from the guest OS 1022 and data reception from the N/W packet reception 2303. When this signal is asserted, the request is converted into Tx by the interrupt generation 2305, and finally notified to the guest OS 1022. The guest OS 1022 recognizes an interrupt from the IO device 1005d, withdraws DMA buffers, and transfers communication data to the guest application 1023.

The register access unit 2301 is activated from register access requests 2311a and 2311b. Since a Posted request and a Non-Posted request to the IO device 1005d are chiefly read/write operation on registers of the IO device 1005d, the DMA flow rate monitoring circuit 1317d and the sequencer 2302 are activated according to the register to be accessed. By this processing, reference to a DMA monitoring counter 1319d from the hypervisor 1020 and the setting of a threshold register 1320d are realized. For register read requests, return data is returned to the CPU via CQ 1314d.

Fourth Embodiment

The following describes a fourth embodiment. This embodiment assumes that a proprietary interface other than PCI express is used as an IO interface.

FIG. 15 shows an example of an internal structure of an inbound control subunit 1005e. This embodiment is different from the first embodiment of the present invention shown in FIG. 3, in that Txes received in the inbound control subunit 1005e are divided into only two systems, a request system Tx and a response system Tx, for processing. The forgoing assumes that Txes to request processing of DMA write and DMA read are contained in the request system Tx, and Txes of end report of DMA write and DMA read reply data are contained in the response system Tx.

The Tx reception & MUX 2401 separates received Tx into a request system Tx 2402 and a response system Tx 2403. The request system Tx 2402 is stored in a request system Tx queue 2406 via a DMA priority control circuit 1301e. The response system Tx 2403 is stored in a response system Tx queue 2407.

The DMA priority control circuit 1303e, like the DMA priority control circuit 1303, internally includes a DMA flow rate monitoring circuit 1317e and a VM information decoder 1321e. Since the DMA flow rate monitoring circuit 1317e and the VM information decoder 1321e are the same as those of the first embodiment shown in FIG. 3, detailed descriptions of them are omitted.

A request system priority setting circuit VM information decoder decides an enqueue destination according to the processing priority 1323. That is, when the processing priority 1323 is 0 (high priority), the received Tx is enqueued in HQ 1307a, and when the processing priority 1323 is 1 (low priority), it is enqueued in LQ 1308a. A request system Tx arbitrating circuit 2405 preferentially fetches Tx from the HQ 1307a and enqueues it in the request system Tx queue 2406. The arbitration rules of the request system Tx arbitrating circuit 2405 are fixed.

The Tx arbitrating circuit 2408 arbitrates Txes stored in the request system Tx queue 2406 and the response system Tx queue 2407, and sends out them to the IO to CPU/memory communication interface 1104. The Tx arbitrating circuit 2408 always preferentially Txes from the response system Tx queue 2407.

It has been demonstrated from the foregoing that the present invention can apply to proprietary interfaces other than PCI express as well.

As has been described above, since the present invention enables the arbitration of IO accesses and band control based on the priority of virtual servers while curbing performance overhead during IO sharing among the virtual servers, finite IO resources can be appropriately allocated even in an information system in which a large number of virtual servers are required to operate.

What is claimed is:

1. A virtual machine system disposed on one computer device including a CPU, a memory, and an IO interface, the virtual machine system comprising:
   a hypervisor that generates plural virtual servers, each of the virtual servers individually executing an operating system; and
   an IO controller that controls the IO interface, the IO controller being located between the IO interface and at least one of the CPU and the memory, and
   wherein the IO controller has:
      a DMA receiving unit that receives DMA requests from the IO interface;
      a virtual server locating unit that identifies the virtual servers corresponding to the received DMA requests;
      a DMA monitoring counter that monitors DMA processing status for each of the virtual servers;
      a threshold register set in advance for each of the virtual servers; and
      a priority deciding unit that compares the DMA monitoring counter and a value of the threshold register, the priority deciding unit deciding the priority of processing of the received DMA requests;
      wherein: the DMA monitoring counter holds credit information indicating the number of receivable DMA requests;

the priority deciding unit assigns high priority to the received DMA requests when the credit information exceeds the threshold register value; and
the priority deciding unit assigns low priority to the received DMA requests when the credit information is less than the threshold register value.

2. The virtual machine system of claim 1,
wherein: the IO controller includes a decoder that decodes the received DMA requests, the decoder acquiring a data payload length;
the DMA monitoring counter holds the sum of data payload lengths of the DMA requests having been processed, for each of the virtual servers;
the threshold register holds the sum of data payload lengths of the DMA requests that can be processed preferentially;
the priority deciding unit assigns low priority to the received DMA requests when the sum held in the DMA monitoring counter exceeds the threshold value; and
the priority deciding unit assigns high priority to the received DMA requests when the sum held in the DMA monitoring counter is less than the threshold value.

3. The virtual machine system of claim 1,
wherein the threshold register is mapped to a memory space or IO space of the CPU.

4. The virtual machine system of claim 1,
wherein the IO controller includes a virtual channel (VC) selecting unit that selects a VC used corresponding to the virtual server.

5. The virtual machine system of claim 4,
wherein the priority deciding unit includes a DMA capping unit that holds processing of the DMA request received for each of the virtual channels.

6. The virtual machine system of claim 1,
wherein the priority deciding unit includes a notification interface that, when selecting a proper priority, notifies the hypervisor of the number of the corresponding virtual server.

7. The virtual machine system of claim 6,
wherein the hypervisor includes a CPU allocation control unit that changes CPU time allocated to the notified virtual server.

8. The virtual machine system of claim 6,
wherein: the hypervisor includes an interrupt notification unit that notifies the virtual servers of an IO interrupt; and
the interrupt notification unit includes an interrupt holding unit that temporarily holds interrupt notification to the notified virtual servers.

9. The virtual machine system of claim 1,
wherein the hypervisor includes:
a user interface that sets a DMA amount that can be processed preferentially for each of the virtual servers; and
a register setting unit that sets the threshold register.

10. A virtual machine system disposed on one computer device including a CPU, a memory, and an IO device,
wherein: the machine system includes a hypervisor that generates plural virtual servers, each of the virtual servers individually executing an operating system; and
the IO device being coupled to the CPU or the memory via an IO controller, and including:
a DMA request issuing unit that issues DMA requests to the memory;
a DMA monitoring counter that monitors issuance status of the DMA requests for each of the virtual servers;
a threshold register that holds a threshold value set for each of the virtual servers; and
a priority deciding unit that compares the value of the DMA monitoring counter and the threshold value for each of the virtual servers, the priority deciding unit deciding the priority of the DMA request to be issued;
wherein: the DMA monitoring counter holds credit information indicating the number of issuable DMA requests;
the threshold register holds a value of preferentially issuable DMA requests;
the priority deciding unit assigns high priority to the DMA request when the credit information exceeds the threshold register value; and
the priority deciding unit assigns low priority to the DMA request when the credit information is less than the threshold register value.

11. The virtual machine system of claim 10,
wherein: the DMA monitoring counter holds the number of DMA requests having been processed;
the threshold register holds the number of preferentially issuable DMA requests;
the priority deciding unit assigns low priority to the DMA request when the number of DMA requests of the DMA monitoring counter exceeds the threshold value; and
the priority deciding unit assigns high priority to the DMA request when the number of DMA requests of the DMA monitoring counter is less than the threshold value.

12. The virtual machine system of claim 10,
wherein the threshold register is mapped to a memory space or IO space of the CPU.

13. The virtual machine system of claim 10,
wherein the priority deciding unit includes a DMA capping unit that holds issuance of the DMA request.

14. A virtual machine system disposed on one computer device, including a processing unit, a storing unit, and an IO interface, the virtual machine system comprising:
a hypervisor that generates plural virtual servers, each of the virtual servers individually executing an operating system;
an IO device including a DMA request issuing unit that is connected to the IO interface, the DMA request issuing unit issuing a DMA request to the storing unit;
an IO controller that controls the IO interface, the IO controller receiving the DMA request issued by the IO device via the IO interface, the IO controller being located between the IO interface and at least one of the processing unit and the storing unit;
a virtual server locating unit that identifies the virtual server corresponding to the DMA request; and
a priority deciding unit that monitors DMA processing status for each of the virtual servers, the priority deciding unit deciding the priority of processing of the DMA request;
wherein the priority deciding unit comprises:
a DMA monitoring counter that monitors DMA processing status for each of the virtual servers;
a threshold register that holds a threshold value set for each of the virtual servers; and
a comparing unit that compares the value of the DMA monitoring counter and the threshold value for each of the virtual servers,
the priority deciding unit assigns high priority to the received DMA requests when the credit information exceeds the threshold register value; and the priority deciding unit assigns low priority to the received DMA requests when the credit information-is less than the threshold register value.

15. The virtual machine system of claim 14,
wherein the priority deciding unit includes a notification interface that, when selecting a proper priority for the virtual servers, notifies the hypervisor of the number of the corresponding virtual server.

16. The virtual machine system of claim 14,
wherein: the hypervisor includes an interrupt notification unit that notifies the virtual servers of an IO interrupt; and
the interrupt notification unit includes an interrupt holding unit that temporarily holds interrupt notification to the notified virtual servers.

17. The virtual machine system of claim 14, wherein the hypervisor includes:
a user interface that sets a DMA amount that can be processed preferentially for each of the virtual servers; and
a register setting unit that sets the threshold register.

* * * * *